US012638852B2

(12) United States Patent
Wood et al.

(10) Patent No.: US 12,638,852 B2
(45) Date of Patent: May 26, 2026

(54) AUTONOMOUS VEHICLE COLLISION MITIGATION SYSTEMS AND METHODS

(71) Applicant: Aurora Operations, Inc., Pittsburgh, PA (US)

(72) Inventors: Matthew Shaw Wood, Pittsburgh, PA (US); William M. Leach, West Bloomfield, MI (US); Scott C. Poeppel, Pittsburgh, PA (US); Nicholas G. Letwin, Pittsburgh, PA (US); Noah Zych, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 19 days.

(21) Appl. No.: 18/464,822

(22) Filed: Sep. 11, 2023

(65) Prior Publication Data

US 2023/0418307 A1     Dec. 28, 2023

Related U.S. Application Data

(63) Continuation of application No. 17/360,599, filed on Jun. 28, 2021, now Pat. No. 11,789,461, which is a
(Continued)

(51) Int. Cl.
  *G05D 1/02*       (2020.01)
  *B60W 30/09*      (2012.01)
  (Continued)

(52) U.S. Cl.
  CPC ........... *G05D 1/0297* (2013.01); *B60W 30/09* (2013.01); *B60W 60/00276* (2020.02);
  (Continued)

(58) Field of Classification Search
  CPC ..... B60W 2420/403; B60W 2420/408; B60W 2554/00; B60W 2554/4026;
  (Continued)

(56) References Cited

U.S. PATENT DOCUMENTS 5,612,883 A    3/1997  Shaffer et al.
5,684,694 A    11/1997 Ishino et al.
(Continued)

FOREIGN PATENT DOCUMENTS

CN      1367886      9/2002
CN      101636304    1/2010
(Continued)

OTHER PUBLICATIONS

International Preliminary Report on Patentability for PCT/US2018/038996, mailed on Jan. 9, 2020, 9 pages.
(Continued)

*Primary Examiner* — Tyler J Lee
(74) *Attorney, Agent, or Firm* — Dority & Manning, P.A.

(57)          ABSTRACT

Systems and methods for controlling an autonomous vehicle are provided. In one example embodiment, a computer-implemented method includes obtaining, from an autonomy system, data indicative of a planned trajectory of the autonomous vehicle through a surrounding environment. The method includes determining a region of interest in the surrounding environment based at least in part on the planned trajectory. The method includes controlling one or more first sensors to obtain data indicative of the region of interest. The method includes identifying one or more objects in the region of interest, based at least in part on the data obtained by the one or more first sensors. The method includes controlling the autonomous vehicle based at least in part on the one or more objects identified in the region of interest.

20 Claims, 7 Drawing Sheets

Related U.S. Application Data continuation of application No. 16/429,437, filed on Jun. 3, 2019, now Pat. No. 11,048,272, which is a continuation of application No. 15/637,539, filed on Jun. 29, 2017, now Pat. No. 10,386,856.

(51) Int. Cl.

| | |
|---|---|
| *B60W 60/00* | (2020.01) |
| *B62D 15/02* | (2006.01) |
| *G01S 13/93* | (2020.01) |
| *G01S 13/931* | (2020.01) |
| *G01S 15/931* | (2020.01) |
| *G01S 17/931* | (2020.01) |
| *G05D 1/00* | (2006.01) |

(52) U.S. Cl.
CPC ........ *B62D 15/0265* (2013.01); *G01S 13/931* (2013.01); *G01S 15/931* (2013.01); *G01S 17/931* (2020.01); *G05D 1/021* (2013.01); *G05D 1/0214* (2013.01); *G05D 1/0257* (2013.01); *G05D 1/0287* (2013.01); *B60W 2420/403* (2013.01); *B60W 2420/408* (2024.01); *B60W 2554/4026* (2020.02); *B60W 2554/4029* (2020.02); *B60W 2554/4041* (2020.02); *B60W 2554/4044* (2020.02)

(58) Field of Classification Search
CPC . B60W 2554/4029; B60W 2554/4041; B60W 2554/4044; B60W 2556/45; B62D 15/0265; G01S 13/931; G01S 15/931; G01S 17/931; G05D 1/021; G05D 1/0214; G05D 1/0257; G05D 1/0287; G05D 1/0297
See application file for complete search history.

(56) References Cited

U.S. PATENT DOCUMENTS

| | | | |
|---|---|---|---|
| 5,684,696 | A | 11/1997 | Rao et al. |
| 6,055,042 | A | 4/2000 | Sarangapani |
| 6,151,539 | A | 11/2000 | Bergholz et al. |
| 6,169,572 | B1 | 1/2001 | Sogawa |
| 8,175,796 | B1 | 5/2012 | Blackburn et al. |
| 8,195,394 | B1 | 6/2012 | Zhu et al. |
| 8,700,251 | B1 | 4/2014 | Zhu et al. |
| 8,849,494 | B1 | 9/2014 | Herbach et al. |
| 8,855,849 | B1 | 10/2014 | Ferguson et al. |
| 8,880,273 | B1 | 11/2014 | Chatham |
| 9,187,088 | B1 | 11/2015 | Ferguson et al. |
| 9,201,242 | B2 | 12/2015 | Miyawaki et al. |
| 9,201,424 | B1 | 12/2015 | Ogale |
| 9,205,835 | B2 | 12/2015 | Stein et al. |
| 9,558,584 | B1* | 1/2017 | Lo ........................ G05D 1/0246 |
| 9,720,412 | B1 | 8/2017 | Zhu et al. |
| 9,805,601 | B1 | 10/2017 | Fields et al. |
| 9,880,560 | B2 | 1/2018 | Han et al. |
| 9,886,856 | B2 | 2/2018 | Dougherty |
| 9,956,693 | B2 | 5/2018 | Keyl et al. |
| 10,065,638 | B1 | 9/2018 | Wood et al. |
| 10,086,782 | B1 | 10/2018 | Konrardy et al. |
| 10,386,856 | B2 | 8/2019 | Wood et al. |
| 10,451,729 | B2* | 10/2019 | Khlifi ...................... G01S 13/86 |
| 10,685,856 | B2 | 6/2020 | Hokaku et al. |
| 10,818,105 | B1 | 10/2020 | Konrardy et al. |
| 2003/0083818 | A1 | 5/2003 | Tojima |
| 2007/0078600 | A1 | 4/2007 | Fregene et al. |
| 2007/0219720 | A1 | 9/2007 | Trepagnier et al. |
| 2009/0292468 | A1 | 11/2009 | Wu et al. |
| 2010/0106356 | A1 | 4/2010 | Trepagnier et al. |
| 2010/0228427 | A1 | 9/2010 | Anderson et al. |
| 2012/0310466 | A1 | 12/2012 | Fairfield et al. |
| 2013/0099943 | A1 | 4/2013 | Subramanya |
| 2014/0032049 | A1 | 1/2014 | Moshchuk et al. |
| 2014/0240502 | A1 | 8/2014 | Strauss et al. |
| 2014/0309806 | A1 | 10/2014 | Ricci |
| 2014/0343750 | A1* | 11/2014 | Minemura ........... B60W 50/04 701/1 |
| 2015/0222859 | A1 | 8/2015 | Schweid |
| 2015/0242953 | A1 | 8/2015 | Suiter |
| 2015/0314780 | A1 | 11/2015 | Stenneth et al. |
| 2016/0063710 | A1 | 3/2016 | Tanaka |
| 2016/0207534 | A1 | 7/2016 | Nishimura et al. |
| 2016/0251016 | A1 | 9/2016 | Pallett et al. |
| 2017/0135277 | A1 | 5/2017 | Hiramatsu et al. |
| 2017/0139418 | A1 | 5/2017 | Hiramatsu et al. |
| 2017/0162050 | A1 | 6/2017 | Chen et al. |
| 2017/0183007 | A1 | 6/2017 | Oh et al. |
| 2017/0227957 | A1 | 8/2017 | Cesarano |
| 2017/0248688 | A1 | 8/2017 | Campbell et al. |
| 2017/0248953 | A1 | 8/2017 | Kelley et al. |
| 2017/0248964 | A1 | 8/2017 | Kentley et al. |
| 2017/0285165 | A1* | 10/2017 | Khlifi .................... G01S 13/931 |
| 2017/0285656 | A1 | 10/2017 | Kohlenberg et al. |
| 2017/0291544 | A1 | 10/2017 | Ishihara et al. |
| 2017/0356994 | A1* | 12/2017 | Wodrich ................ G01S 13/87 |
| 2017/0369052 | A1 | 12/2017 | Nagy et al. |
| 2017/0372431 | A1 | 12/2017 | Perl et al. |
| 2018/0004213 | A1 | 1/2018 | Absmeier et al. |
| 2018/0029592 | A1 | 2/2018 | Trombley et al. |
| 2018/0039273 | A1 | 2/2018 | Delp et al. |
| 2018/0067490 | A1 | 3/2018 | Pollach et al. |
| 2018/0067492 | A1 | 3/2018 | Order et al. |
| 2018/0072313 | A1 | 3/2018 | Stenneth |
| 2018/0120845 | A1 | 5/2018 | Lambermont et al. |
| 2018/0120848 | A1* | 5/2018 | Kulferst .................. G07C 5/00 |
| 2018/0127000 | A1 | 5/2018 | Jiang et al. |
| 2018/0141544 | A1 | 5/2018 | Xiao et al. |
| 2018/0148047 | A1 | 5/2018 | Kadetotad et al. |
| 2018/0188371 | A1 | 7/2018 | Bao et al. |
| 2018/0245958 | A1 | 8/2018 | Bezdek et al. |
| 2018/0247160 | A1 | 8/2018 | Rohani et al. |
| 2018/0262739 | A1 | 9/2018 | Hunt |
| 2018/0315315 | A1 | 11/2018 | Linder et al. |
| 2018/0345958 | A1 | 12/2018 | Lo et al. |
| 2022/0274639 | A1 | 9/2022 | Park et al. |

FOREIGN PATENT DOCUMENTS

| | | |
|---|---|---|
| CN | 104590250 | 5/2013 |
| CN | 104787045 | 7/2015 |
| CN | 104859649 | 8/2015 |
| CN | 105235681 | 1/2016 |
| CN | 105270414 | 1/2016 |
| CN | 105358399 | 2/2016 |
| CN | 105835878 | 8/2016 |
| EP | 2045161 | 4/2009 |
| GB | 201511700 | 8/2015 |
| JP | 2003141692 | 5/2003 |
| JP | 2010033441 | 2/2010 |
| JP | 2015072611 | 4/2015 |
| JP | 2015217762 | 12/2015 |
| JP | 2016517554 | 6/2016 |
| JP | 2016192722 | 11/2016 |
| WO | WO 2016122744 | 8/2016 |
| WO | WO 2016/080452 | 5/2026 |

OTHER PUBLICATIONS

International Search Report and Written Opinion for PCT/US2018/038996, mailed on Sep. 20, 2018, 13 pages.
U.S. Appl. No. 15/668,196, filed Aug. 3, 2017, 37 pages.
U.S. Appl. No. 16/052,899, filed Aug. 2, 2018, 39 pages.
U.S. Appl. No. 17/025,454, filed Sep. 18, 2020, 39 pages.

* cited by examiner

600

601
OBTAIN PLANNED TRAJECTORY INFORMATION

602
DETERMINE REGION OF INTEREST IN SURROUNDING
ENVIRONMENT

603
STEER SENSOR(S) TO REGION OF INTEREST

604
OBTAIN DATA INDICATIVE OF REGION OF INTEREST

605
IDENTIFY OBJECT(S) IN REGION OF INTEREST

606
CONTROL AUTONOMOUS VEHICLE

AUTONOMOUS VEHICLE COLLISION MITIGATION SYSTEMS AND METHODS

PRIORITY CLAIM

The present application is a continuation of U.S. application Ser. No. 17/360,599 having a filing date of Jun. 28, 2021, which claims the benefit of U.S. application Ser. No. 16/429,437 filed Jun. 3, 2019 (issued with U.S. Pat. No. 11,048,272 on June 29, 2021), which claims the benefit of U.S. application Ser. No. 15/637,539 filed Jun. 29, 2017 (issued with U.S. Pat. No. 10,386,856 on Aug. 20, 2019). Applicant claims priority to and the benefit of each of such applications and incorporates all such applications herein by reference in its entirety.

FIELD

The present disclosure relates generally to autonomous vehicle collision mitigation systems and methods.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for controlling an autonomous vehicle. The method includes obtaining, by a computing system comprising one or more computing devices, from an autonomy system that is separate from the computing system, data indicative of a planned trajectory of the autonomous vehicle through a surrounding environment. The method includes determining, by the computing system, a region of interest in the surrounding environment based at least in part on the planned trajectory. The method includes controlling, by the computing system, one or more first sensors to obtain data indicative of the region of interest. The method includes identifying, by the computing system, one or more objects in the region of interest based at least in part on the data obtained by the one or more first sensors. The method includes controlling, by the computing system, the autonomous vehicle based at least in part on the one or more objects identified in the region of interest.

Another example aspect of the present disclosure is directed to a computing system for controlling an autonomous vehicle. The computing system includes one or more processors, and one or more tangible, non-transitory, computer readable media that collectively store instructions that when executed by the one or more processors cause the computing system to perform operations. The operations includes obtaining, from an autonomy system that is separate from the one or more processors, data indicative of a planned trajectory of the autonomous vehicle through a surrounding environment. The operations include determining a region of interest in the surrounding environment based at least in part on the planned trajectory. The operations include controlling one or more first sensors to obtain data indicative of the region of interest. The operations include identifying one or more objects in the region of interest based at least in part on the obtained by the one or more first sensors. The operations include controlling the autonomous vehicle based at least in part on the one or more objects identified in the region of interest.

Yet another example aspect of the present disclosure is directed to an autonomous vehicle. The autonomous vehicle includes one or more processors, and one or more tangible, non-transitory, computer readable media that collectively store instructions that when executed by the one or more processors cause the autonomous vehicle to perform operations. The operations include obtaining, from an autonomy system that is separate from the one or more processors, data indicative of a planned trajectory of the autonomous vehicle through a surrounding environment. The operations include determining a region of interest in the surrounding environment based at least in part on the planned trajectory. The operations include controlling one or more first sensors to obtain data indicative of the region of interest. The operations include identifying one or more objects in the region of interest based at least in part on the data obtained by the one or more first sensors. The operations include controlling the autonomous vehicle based at least in part on the one or more objects identified in the region of interest.

Other example aspects of the present disclosure are directed to systems, methods, vehicles, apparatuses, tangible, non-transitory computer-readable media, and memory devices for controlling an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which make reference to the appended figures, in which.

DETAILED DESCRIPTION

Figure 1:
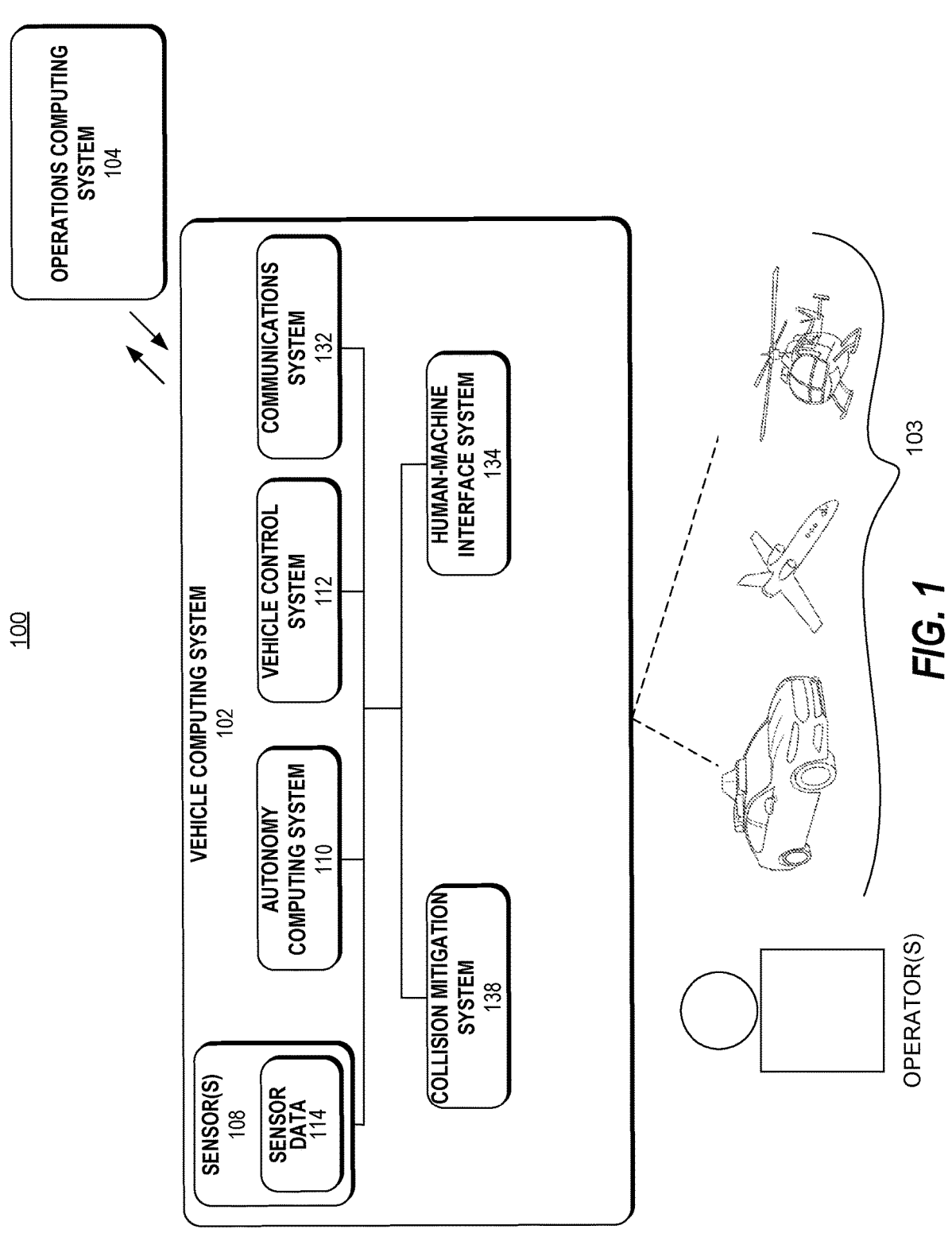
FIG. 1 depicts an example system overview according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to using motion plan data of an autonomous vehicle in a collision mitigation system to improve the safety and accuracy of the vehicle. A collision mitigation system is a safety system located on-board an autonomous vehicle, that is meant to safeguard against failures, shortcomings, and/or unforeseeable events when operating the autonomous vehicle. The collision mitigation system can obtain data indicative of a surrounding environment of the autonomous vehicle, identify object(s) in the surrounding environment, detect potential collision(s), and control the autonomous vehicle to avoid the potential collision(s).

In some implementations, the collision mitigation system can obtain data indicative of a surrounding environment from one or more sensor(s). These sensor(s) are separate from one or more sensor(s) associated with an autonomy system of the autonomous vehicle (e.g., for planning autonomous navigation). The collision mitigation system can also obtain motion plan data from one or more other system(s) located on-board the autonomous vehicle, and/or from one or more remote computing system(s) that are remote from the autonomous vehicle. The collision mitigation system can determine a region of interest in the surrounding environment based at least in part on the motion plan data, and identify and/or detect a potential collision with object(s) in the region of interest. For example, if a trajectory of an autonomous vehicle is "continue forward 500 meters, then turn right," a collision mitigation system can determine a forward-right region (with respect to the autonomous vehicle) as a region of interest. The collision mitigation system can identify one or more object(s) in the forward-right region and detect one or more potential collision(s) with the object(s) in the forward-right region. When a potential collision is detected, the collision mitigation system can control the autonomous vehicle to avoid the potential collision. The collision mitigation system can send one or more actuation request(s) and/or command(s) to one or more actuator(s) to control the autonomous vehicle. The one or more actuator(s) are managed by local controller(s) that receive the actuation request(s) and/or command(s) and execute an action within the bounds of their local operational definition. For example, a collision mitigation system can provide one or more control signals to provide information on a potential collision to one or more other system(s) on-board an autonomous vehicle, or control a motion of the autonomous vehicle via a vehicle control system. In this way, an autonomous vehicle can include a collision mitigation system that can detect a potential collision independent of one or more other system(s) located on-board the autonomous vehicle, to provide redundancy and improve the safety of the vehicle.

In some implementations, the collision mitigation system can identify and provide data indicative of one or more object(s) in a region of interest to one or more other system(s) located on-board the autonomous vehicle. For example, a collision mitigation system can provide data indicative of one or more object(s) in a region of interest to an external indicator system located on-board an autonomous vehicle (e.g., to warn an operator of the autonomous vehicle). In another example, a collision mitigation system can provide data indicative of one or more object(s) in a region of interest to an autonomy computing system located on-board an autonomous vehicle (e.g., to adjust a trajectory of the autonomous vehicle). In this way, an autonomous vehicle can include a collision mitigation system that can identify and provide data indicative of one or more object(s) in a region of interest to one or more other system(s) located on-board the autonomous vehicle, to improve an accuracy with which the autonomous vehicle can identify a potential collision.

An autonomous vehicle can include a vehicle computing system that implements a variety of systems on-board the autonomous vehicle (e.g., located on or within the autonomous vehicle). For instance, the vehicle computing system can include an autonomy computing system (e.g., for planning autonomous navigation), a collision mitigation system (e.g., for detecting and avoiding potential collisions), and a vehicle interface system (e.g., for controlling one or more vehicle control sub-systems responsible for braking, steering, powertrain, etc.). The vehicle interface system of the autonomous vehicle can include one or more vehicle control system(s) for controlling the autonomous vehicle. For instance, the vehicle interface system can include a braking sub-system, acceleration sub-system, steering sub-system, powertrain sub-system, etc. The vehicle interface system can receive one or more vehicle control signal(s) from one or more system(s) on-board the autonomous vehicle. The vehicle interface system can instruct the one or more vehicle control system(s) to control the autonomous vehicle based at least in part on the one or more vehicle control signal(s), for example, in the manner described herein to implement an advanced a collision mitigation system.

An autonomy computing system of an autonomous vehicle can include one or more autonomy sub-system(s) for planning and executing autonomous navigation. For instance, an autonomy computing system can include, among other sub-systems, a perception sub-system, a prediction sub-system, and a motion planning sub-system that cooperate to perceive a surrounding environment of an autonomous vehicle and determine one or more intended trajectories (e.g., included in motion plan data) for controlling a motion of the autonomous vehicle accordingly. An autonomy computing system can perceive a surrounding environment of the autonomous vehicle based at least in part on one or more sensor(s) (e.g., a Light Detection and Ranging (LIDAR) system, a Radio Detection and Ranging (RADAR) system, one or more cameras (e.g., visible spectrum cameras, infrared cameras, etc.), motion sensors, and/or other types of image capture devices and/or sensors. These sensor(s) are separate from one or more sensor(s) associated with the collision mitigation system for identifying and/or detecting a potential collision with one or more object(s) in a region of interest by the collision mitigation system of the autonomous vehicle. The autonomy computing system can identify and/or predict location(s) of one or more object(s) in the surrounding environment, and determine motion plan data to control a motion of the autonomous vehicle in the surrounding environment. The autonomy computing system can provide the motion plan data to one or more other system(s) on-board the autonomous vehicle. For example, an autonomy computing system can provide motion plan data to a collision mitigation system, so that the collision mitigation system can determine a region of interest.

In some implementations, the autonomy computing system can control a motion of the autonomous vehicle based at least in part on one or more object(s) in the surrounding environment of the autonomous vehicle. For example, an autonomy computing system can control an autonomous vehicle to avoid an object in a surrounding environment by providing one or more control signal(s) to move the autonomous vehicle around the object, or to stop the autonomous vehicle before the object.

In some implementations, the autonomy computing system can control one or more setting(s) of the autonomous vehicle based at least in part on one or more object(s) in the surrounding environment of the autonomous vehicle. For example, an autonomy computing system can identify one or more object(s) in a surrounding environment based on one or more associated sensor(s) (e.g., first source) and/or based on data provided by one or more other system(s) on-board the autonomous vehicle (e.g., second source). The autonomy computing system can compare the object(s) identified based on the first source with the object(s) identified based on the second source to determine one or more discrepancies. For example, an autonomy computing system can determine if an object is identified based on the first source but not based on the second source, or vice versa. The autonomy computing system can adjust one or more settings of an autonomous vehicle associated with identifying an object to reduce the one or more discrepancies. For example, an autonomy computing system can implement machine learning to improve one or more object-identification algorithm(s) of the autonomous vehicle.

A collision mitigation system of an autonomous vehicle can include one or more sub-system(s) for detecting and avoiding one or more potential collision(s). For instance, a collision mitigation system can perceive a surrounding environment of the autonomous vehicle based at least in part on one or more sensor(s) (e.g., a Radio Detection and Ranging (RADAR) system, one or more cameras, and/or other types of image capture devices and/or sensors). These sensor(s) are separate from the one or more sensor(s) associated with the autonomy computing system for planning and executing autonomous navigation. The collision mitigation system can identify and/or detect a potential collision with one or more object(s) in the surrounding environment based on data acquired via the sensor(s) associated with the collision mitigation system.

The collision mitigation system can obtain motion plan data of the autonomous vehicle from one or more other system(s) on-board the autonomous vehicle (e.g., the autonomy computing system). The motion plan data can include one or more intended/planned trajectories of the autonomous vehicle. The collision mitigation system can determine a region of interest in a surrounding environment of the autonomous vehicle based at least in part on the motion plan data. For example, if an intended trajectory of an autonomous vehicle is "continue forward 500 meters, then turn right," a collision mitigation system can determine a forward-right region (with respect to the autonomous vehicle) as a region of interest. As another example, if an intended trajectory of an autonomous vehicle is "reverse," then a collision mitigation system can determine a rear-region (with respect to the autonomous vehicle) as a region of interest. As yet another example, if an intended trajectory of an autonomous vehicle is "stay in middle lane and turn left," then a collision mitigation system can determine a forward-left region and an immediate-left region (with respect to the autonomous vehicle) as a region of interest.

In some implementations, the collision mitigation system can steer one or more of its associated sensor(s) to the region of interest. For example, each sensor on-board an autonomous vehicle, that is associated with the collision mitigation system, can specify a corresponding region of detection. A region of detection for a particular sensor can indicate one or more region(s) in the surrounding environment in which a collision mitigation system can identify and/or detect a potential collision based on that particular sensor. The collision mitigation system can steer one or more of its sensor(s) so that a corresponding region of detection for each of the sensor(s) overlap at least in part with a region of interest. For example, a collision mitigation system can steer a sensor by controlling a physical position of the sensor via one or more actuator(s). In another example, a collision mitigation system can steer a sensor by filtering data corresponding to a region of interest from data provided by the sensor.

In some implementations, the collision mitigation system can control an autonomous vehicle based at least in part on one or more object(s) in a region of interest. For example, a collision mitigation system can obtain data indicative of a region of interest in a surrounding environment of an autonomous vehicle. The collision mitigation system can identify and/or detect a potential collision with one or more object(s) in the region of interest. When the collision mitigation system detects a potential collision with an object in the region of interest, then the collision mitigation system can provide one or more control signal(s) to avoid the potential collision by controlling an autonomous vehicle to execute a braking maneuver, steering maneuver, etc.

In some implementations, the collision mitigation system can provide data indicative of the one or more object(s) in a region of interest to one or more other system(s) on-board an autonomous vehicle. For example, when a collision mitigation system identifies object(s) in a region of interest, the collision mitigation system can provide data indicative of the object(s) to an autonomy computing system. The autonomy computing system can control the autonomous vehicle to avoid the object(s) and/or adjust one or more settings of the autonomous vehicle, based at least in part on the data provided by the collision mitigation system.

Systems and methods for using motion plan data of an autonomous vehicle in a collision mitigation system on-board the autonomous vehicle can also have a technical effect of reducing false positives, and improving accuracy and reliability. By enabling a collision mitigation system that can obtain motion plan data of the autonomous vehicle, the collision mitigation system can identify and steer sensor(s) associated with the collision mitigation system to a region of interest in a surrounding environment of the autonomous vehicle. This allows the collision mitigation system to focus on the region in the surrounding environment that is most likely to contain a potential collision, and to exclude potential collision(s) within one or more regions that are not associated with an intended trajectory of the autonomous vehicle, thereby reducing a number of false positives.

Additionally, by enabling a collision mitigation system to identify and/or detect a potential collision with object(s) in a region of interest based on sensor(s) that are separate from the sensor(s) that are associated with an autonomy computing system, the collision mitigation system can detect potential collision(s) independent of other system(s) on-board the autonomous vehicle. This allows the collision mitigation system to provide data indicative of the one or more object(s) to the autonomy computing system that can combine and/or compare the data with its own data, thereby improving the accuracy and reliability with which the autonomous vehicle can identify a potential collision.

The systems and methods of the present disclosure also provide an improvement to vehicle computing technology, such as autonomous vehicle computing technology. For instance, the systems and methods herein enable the vehicle technology to use motion plan data of an autonomous vehicle in a collision mitigation system on-board the autonomous vehicle. For example, the systems and methods can allow one or more computing device(s) (e.g., of a collision mitigation system) on-board an autonomous vehicle to determine a region of interest in a surrounding environment of the autonomous vehicle. As described herein, an autonomous vehicle can be configured to communicate motion plan data of the autonomous vehicle and data indicative of one or more objects in a surrounding environment of the autonomous vehicle. The computing device(s) can determine the region of interest based at least in part on the motion plan data, and control the autonomous vehicle based at least in part on one or more object(s) that are in the region of interest. This allows the autonomous vehicle to more effectively inform one or more other system(s) on-board the autonomous vehicle to avoid a potential collision.

Moreover, the computing device(s) can be included in a collision mitigation system that is separate and apart from the other systems on-board the autonomous vehicle (e.g., autonomy computing system, vehicle interface system). As such, the collision mitigation system can include a simplified hardware architecture that is easier to upgrade, implement mode/redundancy checks, etc. This can also allow the computing device(s) to focus its computational resources on detecting and avoiding potential collisions, rather than allocating its resources to perform other vehicle functions (e.g., autonomous motion planning, motion plan implementation). Such use of resources can allow the computing device(s) to provide a more efficient, reliable, and accurate response to an event. Additionally, the other systems on-board the autonomous vehicle can focus on their core functions, rather than allocating resources to the functions of the collision mitigation system. Thus, the systems and methods of the present disclosure can save the computational resources of these other vehicle systems, while increasing performance of the collision mitigation system.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 103. In some implementations, the system 100 can include an operations computing system 104 that is remote from the vehicle 103.

The vehicle 103 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 103 can be an autonomous vehicle that can drive, navigate, operate, etc. with minimal and/or no interaction from a human driver. For instance, the vehicle 103 can be configured to operate in a plurality of operating modes 106A-C. The vehicle 103 can be configured to operate in a fully autonomous (e.g., self-driving) operating mode 106A in which the vehicle 103 can drive and navigate with no input from a user present in the vehicle 103. The vehicle 103 can be configured to operate in a semi-autonomous operating mode 106B in which the vehicle 103 can operate with some input from a user present in the vehicle 103. In some implementations, the vehicle 103 can enter into a manual operating mode 106C in which the vehicle 103 is fully controllable by a user (e.g., human operator) and can be prohibited from performing autonomous navigation (e.g., autonomous driving).

The vehicle computing system 102 can include one or more computing devices located on-board the vehicle 103 (e.g., located on and/or within the vehicle 103). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 103 (e.g., its computing system, one or more processors, etc.) to perform operations and functions, such as those described herein.

As shown in FIG. 1, the vehicle 103 can include one or more sensors 108, an autonomy computing system 110, vehicle control system 112, human-machine interface system 134, and collision mitigation system 138. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 114 associated with one or more objects that are proximate to the vehicle 103 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 114 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 103. The sensor data 114 can be indicative of locations associated with the object(s) within the surrounding environment of the vehicle 103 at one or more times. The sensor(s) 108 can provide the sensor data 114 to the autonomy computing system 110.

Figure 2:
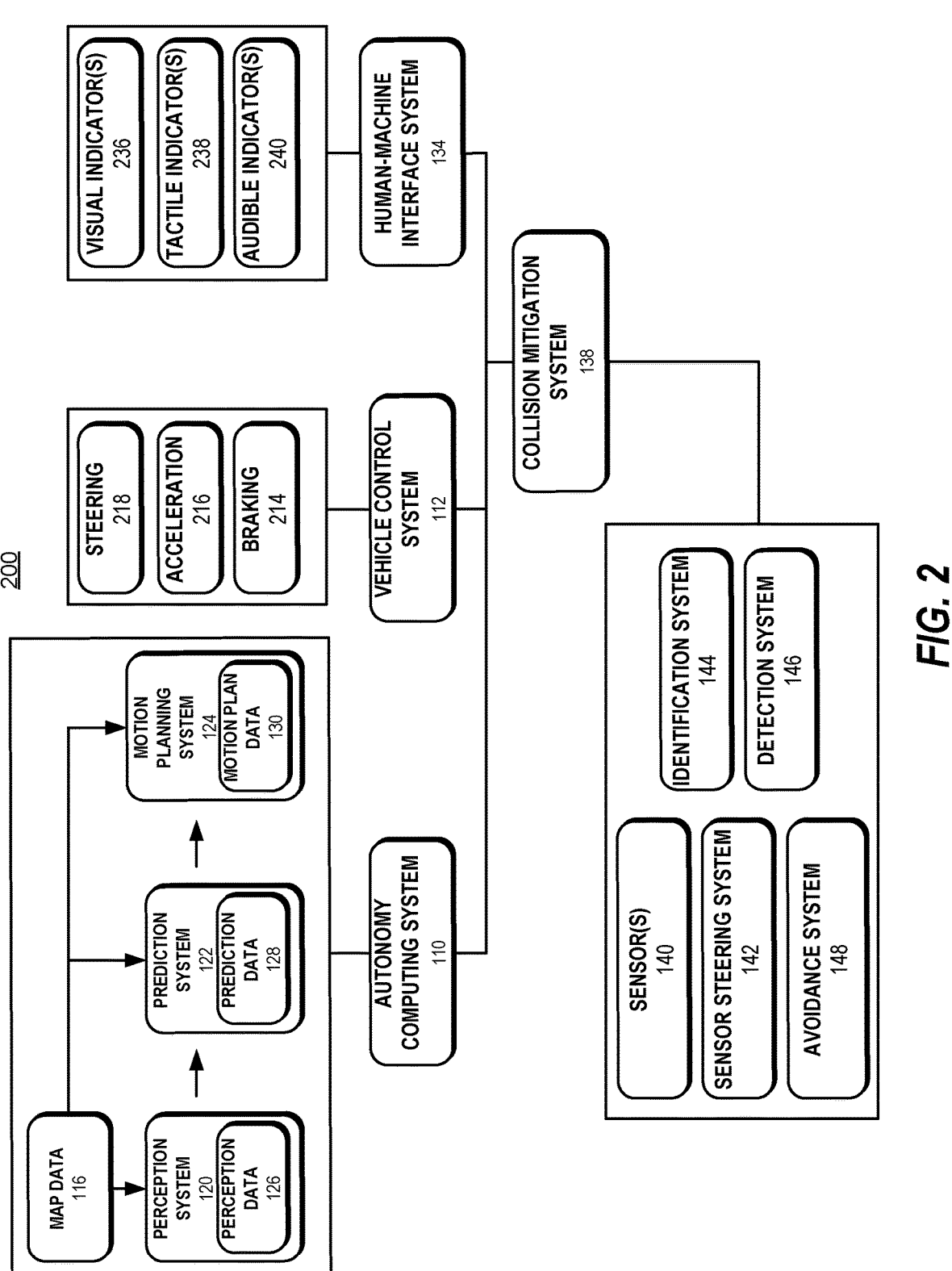
FIG. 2 depicts an example vehicle control system for controlling an autonomous vehicle according to example embodiments of the present disclosure.

As shown in FIG. 2, the autonomy computing system 110 can retrieve or otherwise obtain map data 116, in addition to the sensor data 114. The map data 116 can provide detailed information about the surrounding environment of the vehicle 103. For example, the map data 116 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 103 in comprehending and perceiving its surrounding environment and its relationship thereto.

The autonomy computing system 110 can include a perception system 120, a prediction system 122, a motion planning system 124, and/or other systems that cooperate to perceive the surrounding environment of the vehicle 103 and determine a motion plan for controlling the motion of the vehicle 103 accordingly. For example, the autonomy computing system 110 can receive the sensor data 114 from the sensor(s) 108, attempt to comprehend the surrounding environment by performing various processing techniques on the sensor data 114 (and/or other data), and generate an appropriate motion plan through such surrounding environment. The autonomy computing system 110 can control the one or more vehicle control systems 112 to operate the vehicle 103 according to the motion plan.

The autonomy computing system 110 can identify one or more objects that are proximate to the vehicle 103 based at least in part on the sensor data 114 and/or the map data 116. For example, the perception system 120 can obtain perception data 126 descriptive of a current state of an object that is proximate to the vehicle 103. The perception data 126 for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. In some implementations, the perception system 120 can determine perception data 126 for each object over a number of iterations. In particular, the perception system 120 can update the perception data 126 for each object at each iteration. Thus, the perception system 120 can detect and track objects (e.g., vehicles, pedestrians, bicycles, and the like) that are proximate to the autonomous vehicle 103 over time. The perception system 120 can provide the perception data 126 to the prediction system 122 (e.g., for predicting the movement of an object).

The prediction system 122 can create predicted data 128 associated with each of the respective one or more objects proximate to the vehicle 103. The predicted data 128 can be indicative of one or more predicted future locations of each respective object. The predicted data 128 can be indicative of a predicted path (e.g., predicted trajectory) of at least one object within the surrounding environment of the vehicle 103. For example, the predicted path (e.g., trajectory) can indicate a path along which the respective object is predicted to travel over time (and/or the speed at which the object is predicted to travel along the predicted path). The prediction system 122 can provide the predicted data 128 associated with the object(s) to the motion planning system 124.

The motion planning system 124 can determine a motion plan for the vehicle 103 based at least in part on the predicted data 128 (and/or other data), and save the motion plan as motion plan data 130. The motion plan data 130 can include vehicle actions with respect to the objects proximate to the vehicle 103 as well as the predicted movements. For instance, the motion planning system 124 can implement an optimization algorithm that considers cost data associated with a vehicle action as well as other objective functions (e.g., based on speed limits, traffic lights, etc.), if any, to determine optimized variables that make up the motion plan data 130. By way of example, the motion planning system 124 can determine that the vehicle 103 can perform a certain action (e.g., pass an object) without increasing the potential risk to the vehicle 103 and/or violating any traffic laws (e.g., speed limits, lane boundaries, signage). The motion plan data 130 can include a planned trajectory, speed, acceleration, etc. of the vehicle 103.

The motion planning system 124 can provide at least a portion of the motion plan data 130 that indicates one or more vehicle actions, a planned trajectory, and/or other operating parameters to the vehicle control system(s) 112 to implement the motion plan for the vehicle 103. For instance, the vehicle 103 can include a mobility controller configured to translate the motion plan data 130 into instructions. By way of example, the mobility controller can translate the motion plan data 130 into instructions to adjust the steering of the vehicle 103 "X" degrees, apply a certain magnitude of braking force, etc. The mobility controller can send one or more control signals to the responsible vehicle control sub-system (e.g., braking control system 214, steering control system 218, acceleration control system 216) to execute the instructions and implement the motion plan.

The vehicle 103 can include a communications system 132 configured to allow the vehicle computing system 102 (and its computing device(s)) to communicate with other computing devices (e.g., shown in FIG. 1). The vehicle computing system 102 can use the communications system 132 to communicate with the operations computing system 104 and/or one or more other remote computing device(s) over one or more networks (e.g., via one or more wireless signal connections). In some implementations, the communications system 132 can allow communication among one or more of the system(s) on-board the vehicle 103. The communications system 132 can include any suitable sub-systems for interfacing with one or more network(s), including, for example, transmitters, receivers, ports, controllers, antennas, and/or other suitable sub-systems that can help facilitate communication.

The vehicle 103 can include a human-machine interface system 134 configured to communicate information to (and/or receive information from) a user (e.g., an operator). For example, in some implementations, the human-machine interface system 134 can include a display device that displays a user interface that can be viewed by a user. In some implementations, the human-machine interface system 134 can control one or more one or more aspects of the vehicle 103, as such one or more indicator(s). For example, the human-machine interface system 134 can control one or more of visual indicator(s) 236 (e.g., light(s), display(s), etc.), tactile indicator(s) 238 (e.g., ultrasound emitter(s), vibration motor(s), etc.), and audible indicator(s) 240 (e.g., speaker(s), etc.) located on-board the vehicle 103. The one or more indictor(s) can indicate a state of the vehicle 103 via an indication. For example, the visual indicator(s) can emit a visual indication (e.g., a warning light, display, etc.), the tactile indicator(s) can emit a tactile indication (e.g., touch response vibration or ultrasound, etc.), and/or audible indicator(s) can emit an audible indication (e.g., a sound via a speaker, etc.). The human-machine interface system 134 can receive control signals from one or more system(s) on-board the vehicle 103 to control the one or more indicator(s). For example, if a trajectory of the vehicle 103 includes an upcoming left turn, then the autonomy computing system 110 can control the human-machine interface system 134 (e.g., via one or more control signal(s)) to activate a left turn signal light of the vehicle 103. In another example, a human driver can control the human-machine interface system 134 (e.g., via a turn signal lever) to activate a left turn signal light of the vehicle 103.

The collision mitigation system 138 can include one or more sensor(s) 140, a sensor steering system 142, an identification system 144, a detection system 146, and an avoidance system 148. The sensor(s) 140 are separate from sensor(s) 108 (e.g., the LIDAR system). The collision mitigation system 138 can monitor a surrounding environment of the vehicle 103 using the sensor(s) 140 (e.g., a Radio Detection and Ranging (RADAR) system, one or more cameras, and/or other types of image capture devices and/or sensors). The identification system 144 can identify one or more object(s) in the surrounding environment based at least in part on information provided by the sensor(s) 140. The detection system 146 can detect one or more potential collision(s) with the object(s) identified by the identification system 144. When a potential collision is detected, the avoidance system 148 can control the vehicle 103 to avoid the potential collision. For example, if vehicle 103 is operating in autonomous mode 106A and the collision mitigation system 138 detects a potential collision, the collision mitigation system 138 can provide information on the potential collision to the autonomy computing system 110 that can adjust a trajectory of the vehicle 103 to avoid the potential collision. As another example, if the vehicle 103 is operating in manual mode 106C and the collision mitigation system 136 detects a potential collision, then the collision mitigation system 136 can control the human-machine interface system 134 to display a warning light to operator(s) of the vehicle 103.

In some implementations, the collision mitigation system 138 can control a motion of the vehicle 103 to avoid a potential collision. For example, if a potential collision persists for a time after the collision mitigation system 138 provides information associated with the potential collision to the autonomy computing system 110, then the collision mitigation system 138 can provide one or more control signal(s) to control the vehicle 103 to execute a braking maneuver. As another example, if a potential collision persists for a time after the collision mitigation system 138 controls the vehicle 103 to display a warning light, then the collision mitigation system 138 can provide one or more control signal(s) to control the vehicle 103 to execute a braking maneuver.

In some implementations, collision mitigation system 138 can obtain motion plan data of the vehicle 103 from one or more other system(s) on-board the vehicle 103 (e.g., the autonomy computing system). The motion plan data can include one or more intended trajectories of vehicle 103 and can be the same as or similar to the motion plan data 130 (e.g., used to implement the motion plan via the vehicle control system 112). The collision mitigation system 138 can determine a region of interest in a surrounding environment of the vehicle 103 based at least in part on the motion plan data. For example, if an intended trajectory of a vehicle 103 is "continue forward 500 meters, then turn right," a collision mitigation system 138 can determine a forward-right region (with respect to the autonomous vehicle) as a region of interest. As another example, if an intended trajectory of a vehicle 103 is "reverse," then a collision mitigation system 138 can determine a rear-region (with respect to the vehicle 138) as a region of interest. As yet another example, if an intended trajectory of a vehicle 103 is "stay in middle lane and turn left," then a collision mitigation system 138 can determine a forward-left region and an immediate-left region (with respect to the vehicle 103) as a region of interest.

In some implementations, the sensor steering system 142 can steer one or more of the sensor(s) 140 to the region of interest. For example, each of the sensor(s) 140 can specify a corresponding region of detection. A region of detection for a particular sensor can indicate one or more region(s) in the surrounding environment in which the collision mitigation system 138 can identify object(s) and/or detect potential collision(s) based on that particular sensor. The collision mitigation system 138 can steer one or more of its sensor(s) 140 so that a region of detection corresponding to each of the sensor(s) 140 will overlap at least in part with the region of interest. For example, the collision mitigation system 138 can steer a sensor by controlling a physical position of the sensor via one or more actuator(s). In another example, the collision mitigation system 138 can steer a sensor by filtering data corresponding to the region of interest from data provided by the sensor.

Figures 3A, 3B, 3C:
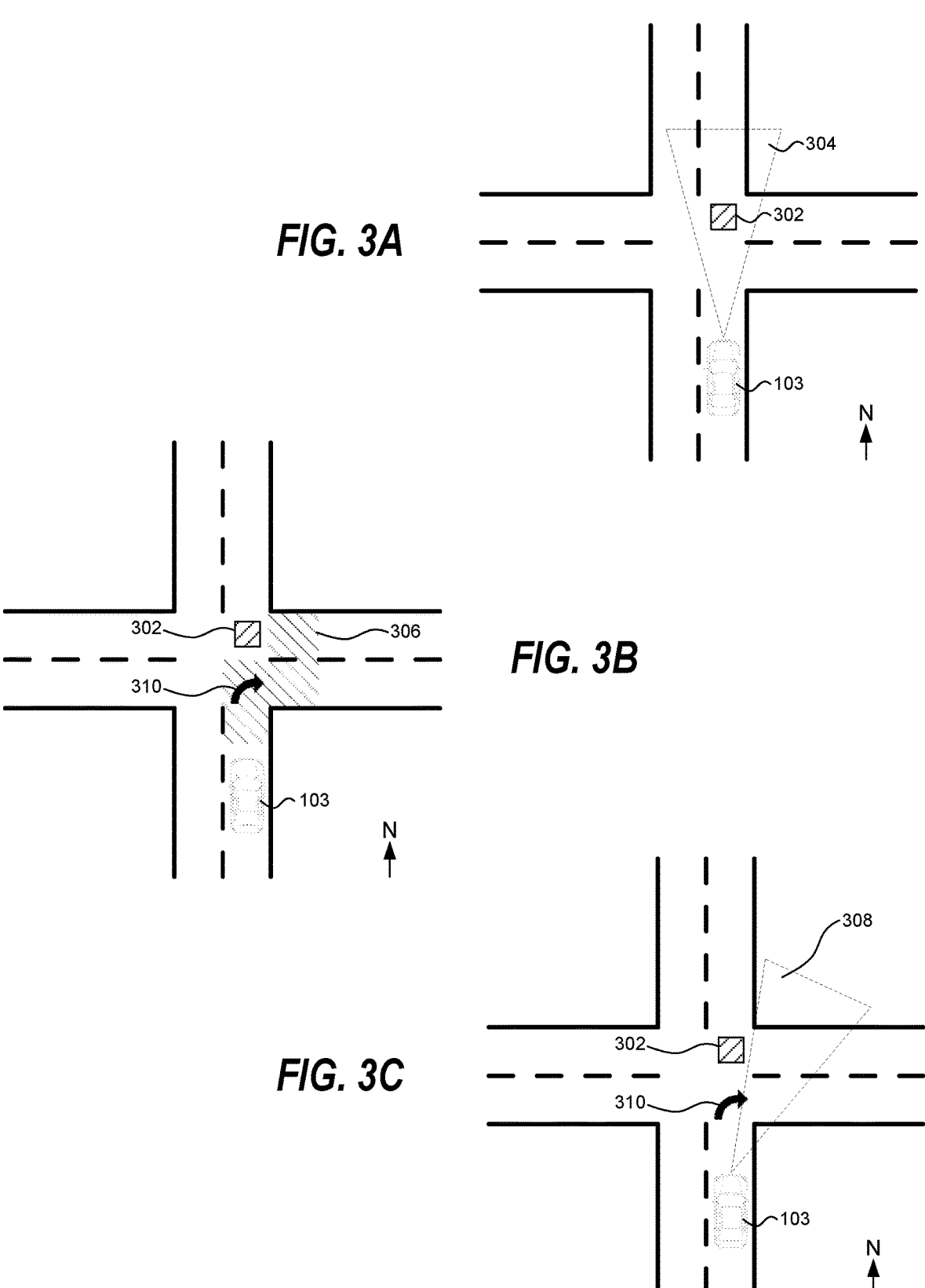
FIG. 3A-3C depict an example diagram illustrating example implementations of controlling an autonomous vehicle according to example embodiments of the present disclosure.

FIGS. 3-5 depict example scenarios of controlling the vehicle 103 according to example embodiments of the present disclosure. In each FIG. 3-5, the vehicle 103 is travelling due north. As shown in FIG. 3A, the sensor(s) 140 of the vehicle 103 have a range of detection 304 before steering. Since object 302 is in the region of detection 304, the collision mitigation system 138 identifies object 302 and detects a potential collision with respect to object 302. In FIG. 3B, the collision mitigation system 138 receives motion plan data 310 from the autonomy computing system 110. The motion plan data 310 indicates that the vehicle 103 will turn right at the next intersection. Based at least in part on the motion plan data 310, the collision mitigation system 138 determines region of interest 306. In FIG. 3C, the sensor steering system 142 controls the sensor(s) 140 so that the region of detection 308 maximally overlaps with the region of interest 306. The region of detection 308 does not include the object 302. In this way, a false positive potential collision(s) that are detected by the collision mitigation system 138 can be reduced.

Figures 4A, 4B, 4C:
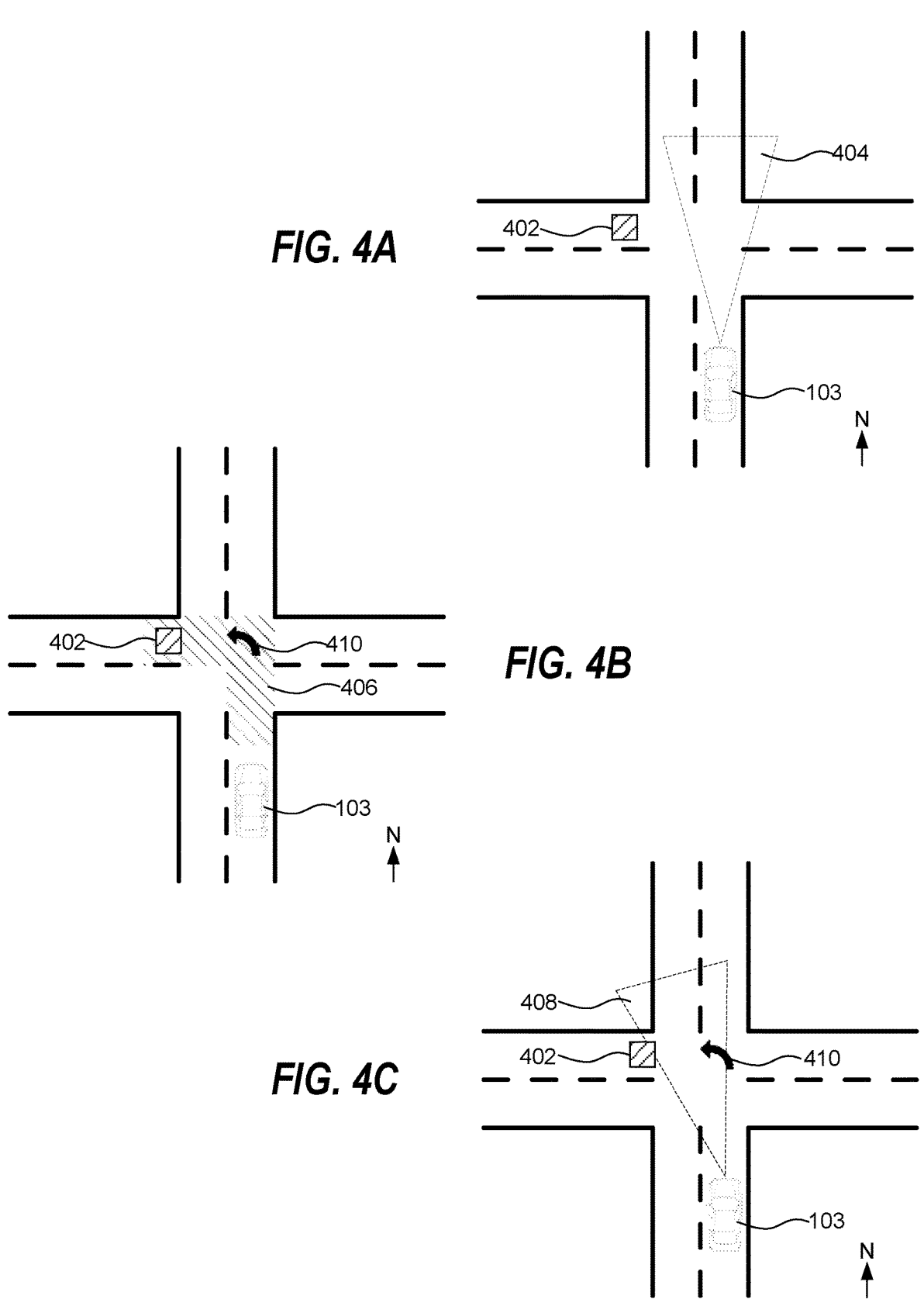
FIG. 4A-4C depict an example diagram illustrating example implementations of controlling an autonomous vehicle according to example embodiments of the present disclosure.

As shown in FIG. 4A, the sensor(s) 140 of the vehicle 103 have a region of detection 404 before steering. Since there are no object(s) in the region of detection 404, the collision mitigation system 138 does not detect a potential collision. In FIG. 4B, the collision mitigation system 138 receives motion plan data 410 from the autonomy computing system 110. The motion plan data 410 indicates that the vehicle 103 will turn left at the next intersection. Based at least in part on the motion plan data 410, the collision mitigation system 138 determines region of interest 406. In FIG. 4C, the sensor steering sub-system 142 controls the sensor(s) 140 so that the region of detection 408 maximally overlaps with the region of interest 406. Since the region of detection 408 includes at least a portion of object 402, the collision mitigation system 138 identifies object 402 and detects a potential collision with respect to object 402. In this way, false negative potential collision(s) (e.g., potential collisions(s) that are not detected) can be reduced. The collision mitigation system 138 can provide one or more control signal(s) to avoid the potential collision (e.g., to the autonomy system 110, the vehicle control system 112, etc.) as described herein.

Figures 5A, 5B, 5C:
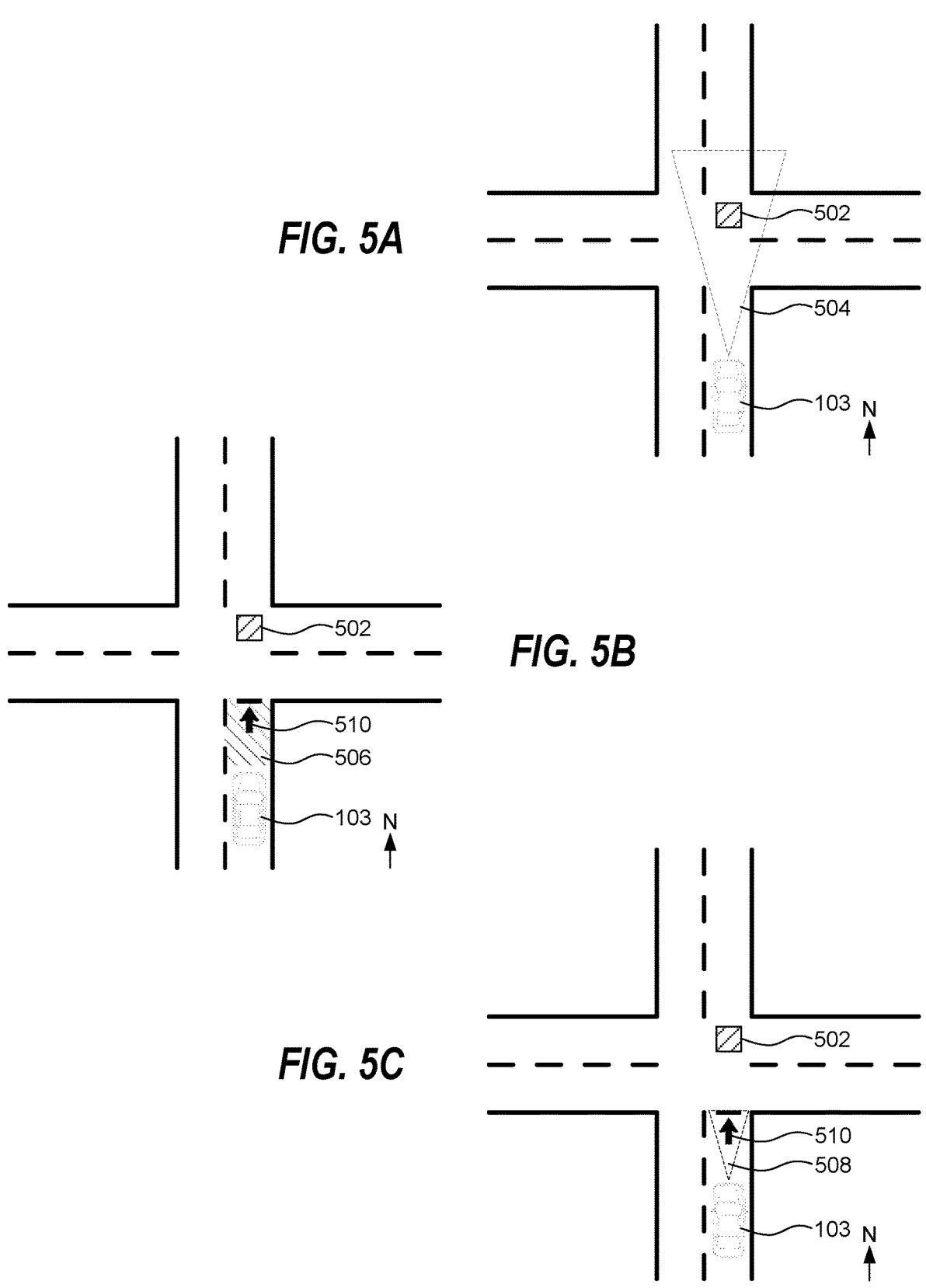
FIG. 5A-5C depict an example diagram illustrating example implementations of controlling an autonomous vehicle according to example embodiments of the present disclosure.

As shown in FIG. 5A, the sensor(s) 140 of the vehicle 103 have a region of detection 504 before steering. Since object 502 is in the region of detection 504, the collision mitigation system 138 identifies object 502 and detects a potential collision with respect to object 502. In FIG. 5B, the collision mitigation system 138 receives motion plan data 510 from the autonomy computing system 110. The motion plan data 510 indicates that the vehicle 103 will come to a stop at the next intersection. Based at least in part on the motion plan data 510, the collision mitigation system 138 determines region of interest 506. In FIG. 5C, the sensor steering system 142 controls the sensor(s) 140 so that the region of detection 508 maximally overlaps with the region of interest 506. The region of detection 508 does not include the object 502. In this way, a false positive potential collision(s) that are detected by the collision mitigation system 138 can be reduced. In the event that the vehicle 103 were to continue through the intersection, the region of interest can be interactively updated (e.g., in real-time) such that a potential collision, if any, with the object 502 would be detected and avoided, as described herein.

Figure 6:
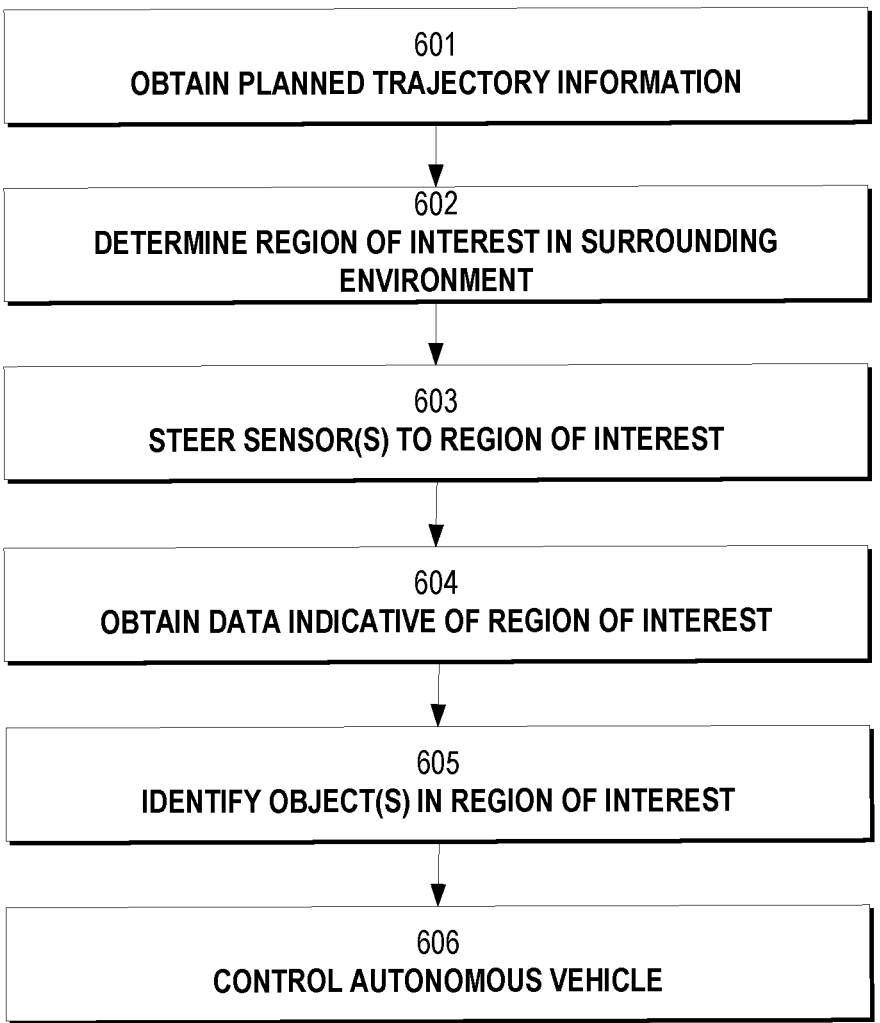
FIG. 6 depicts a flow diagram of controlling an autonomous vehicle according to example embodiments of the present disclosure.

FIG. 6 depicts a flow diagram of an example method 600 of controlling the vehicle 103 according to example embodiments of the present disclosure. One or more portion(s) of the method 600 can be implemented by one or more computing device(s) such as, for example, the computing device(s) 701 shown in FIG. 7. Moreover, one or more portion(s) of the method 600 can be implemented as an algorithm on the hardware components of the device(s) described herein (e.g., as in FIGS. 1 and 7) to, for example, control the vehicle 103. FIG. 6 depicts elements performed in a particular order for purposes of illustration and discussion. Those of ordinary skill in the art, using the disclosures provided herein, will understand that the elements of any of the methods (e.g., of FIG. 6) discussed herein can be adapted, rearranged, expanded, omitted, combined, and/or modified in various ways without deviating from the scope of the present disclosure.

At (601), the method 600 can include obtaining trajectory information. For instance, the collision mitigation system 138, of the vehicle computing system 102, can obtain from the autonomy computing system 110 that is separate from the collision mitigation system 138, data indicative of a planned trajectory of the autonomous vehicle through a surrounding environment.

At (602), the method 600 can include determining a region of interest in the surrounding environment of the vehicle 103. For instance, the collision mitigation system 138 can determine a region of interest in the surrounding environment based at least in part on the planned trajectory.

At (603), the method 600 can include steering one or more sensor(s) to the determined region of interest. For instance, the collision mitigation system 138 can steer the sensor(s) 140 of the vehicle 103 toward the region of interest. For example, the collision mitigation system 138 can adjust a region of detection associated with each of the sensor(s) 140 to overlaps (e.g., maximally, at least in part, etc.) with the region of interest. Adjusting the region of detection can include physically moving each of the sensor(s) 140 via one or more actuators associated with each of the sensor(s).

At (604), the method 600 can include obtaining data indicative of the region of interest. For instance, the collision mitigation system 138 can control the sensor(s) 140 to obtain data indicative of the region of interest. Controlling the sensor(s) 140 can include controlling the sensor(s) 140 that have been steered toward the region of interest, to obtain the data indicative of the region of interest.

At (605), the method 600 can include identifying object(s) in the region of interest. For instance, the collision mitigation system 138 can identify one or more object(s) in the region of interest based at least in part on the data obtained by the sensor(s) 140.

At (606), the method 600 can include controlling an autonomous vehicle. For instance, the collision mitigation system 138 can control the vehicle 103 based at least in part on the one or more objects identified in the region of interest. In some implementations, controlling the vehicle 103 can include providing one or more control signal(s) to the vehicle control system 112 to control a motion of the vehicle 103. In some implementations, controlling the vehicle 103 can include providing data indicative of the one or more object(s) in the region of interest to the autonomy computing system 110. The autonomy computing system 110 can adjust a trajectory of the vehicle 103 to avoid the object(s). In some implementations, controlling the vehicle 103 can include providing one or more control signal(s) to the human-machine interface system 134 to indicate the object(s) to a human driver who can take appropriate action to avoid the object(s). In some implementations, the collision mitigation system 138 can detect one or more potential collision(s) in the region of interest with respect to the object(s), and provide information on the potential collision(s) to the autonomy computing system 110, human-machine interface system 134, and/or other system(s) on-board the vehicle 103.

Figure 7:
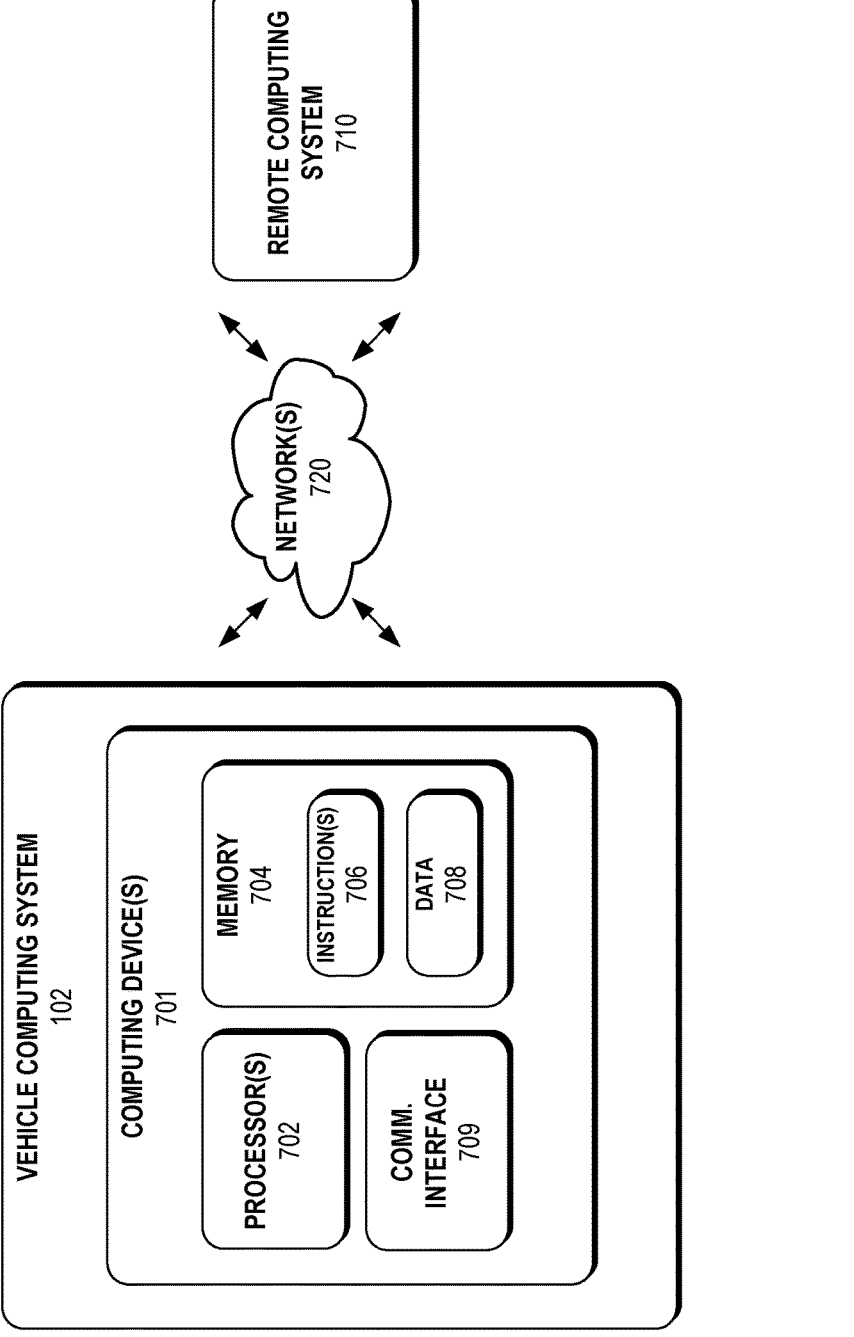
FIG. 7 depicts example system sub-systems according to example embodiments of the present disclosure.

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 102 of the vehicle 103 and, in some implementations, a remote computing system 710 including one or more remote computing device(s) that are remote from the vehicle 103 (e.g., the operations computing system 104) that can be communicatively coupled to one another over one or more networks 720. The remote computing system 710 can be associated with a central operations system and/or an entity associated with the vehicle 103 such as, for example, a vehicle owner, vehicle manager, fleet operator, service provider, etc.

The computing device(s) 701 of the vehicle computing system 102 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle 103 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 103 can store instructions 706 that when executed by the one or more processors 702 on-board the vehicle 103 cause the one or more processors 702 (the vehicle computing system 102) to perform operations such as any of the operations and functions of the vehicle computing system 102, as described herein, the operations for controlling the vehicle 103 (e.g., one or more portions of method 600), and/or any other operations and functions described herein.

The memory 704 can store data 708 that can be obtained, received, accessed, written, manipulated, created, and/or stored. The data 708 can include, for instance, data associated with a motion plan of the vehicle, data associated with a surrounding environment of the vehicle and/or a region of interest, data associated with one or more objects identified in a surrounding environment of the vehicle and/or a region of interest, and/or other data/information as described herein. In some implementations, the computing device(s) 701 can obtain data from one or more memory device(s) that are remote from the vehicle 103.

The computing device(s) 701 can also include a communication interface 709 used to communicate with one or more other system(s) on-board the vehicle 103 and/or a remote computing device that is remote from the vehicle 103 (e.g., of remote computing system 710). The communication interface 709 can include any circuits, sub-systems, software, etc. for communicating via one or more networks (e.g., 720). In some implementations, the communication interface 709 can include, for example, one or more of a communications controller, receiver, transceiver, transmitter, port, conductors, software, and/or hardware for communicating data.

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system 710 can include one or more remote computing devices that are remote from the vehicle computing system 102. The remote computing devices can include sub-systems (e.g., processor(s), memory, instructions, data) similar to that described herein for the computing device(s) 701. Moreover, the remote computing system 710 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle control system for a vehicle, comprising:
   one or more processors; and
   one or more tangible, non-transitory, computer-readable media that store instructions executable by the one or more processors to cause the vehicle control system to perform operations, the operations comprising:
   monitoring, by an event response system that is separate from the vehicle control system on-board the vehicle and using one or more perception sensors controlled by a sensor steering system of the event response system, a surrounding environment of the vehicle, wherein the one or more perception sensors are independent from sensors associated with the vehicle control system;
   based on monitoring the surrounding environment, identifying, by the event response system, one or more objects;
   detecting, by the event response system, one or more potential collisions with the one or more objects, wherein the one or more potential collisions are associated with a region of interest; and
   adjusting the one or more perception sensors associated with the event response system to obtain data indicative of the region of interest, the region of interest associated with a trajectory of the vehicle.

2. The vehicle control system of claim 1, wherein adjusting the one or more perception sensors associated with the event response system comprises filtering data corresponding to the region of interest, wherein the data indicative of the region of interest is obtained by the one or more perception sensors.

3. The vehicle control system of claim 1, wherein detecting one or more potential collisions with the one or more objects comprises:
   receiving sensor data from at least one sensor associated with the vehicle control system, wherein the sensor data includes data associated with the one or more objects; and
   determining, based on the sensor data, a movement of the one or more objects.

4. The vehicle control system of claim 3, the operations further comprising determining a predicted trajectory of at least one object of the one or more objects, the predicted trajectory indicative of a path along which the at least one object is predicted to travel over time.

5. The vehicle control system of claim 1, wherein the vehicle is an autonomous truck.

6. The vehicle control system of claim 1, the operations further comprising adjusting a trajectory of the vehicle based on detecting the one or more potential collisions.

7. The vehicle control system of claim 1, wherein monitoring the surrounding environment of the vehicle comprises iteratively detecting and tracking the one or more objects.

8. A computer-implemented method comprising:
   monitoring, by an event response system that is separate from a vehicle control system on-board a vehicle and using one or more perception sensors controlled by a sensor steering system of the event response system, a surrounding environment of the vehicle, wherein the one or more perception sensors are independent from sensors associated with the vehicle control system;
   based on monitoring the surrounding environment, identifying, by the event response system one or more objects;

detecting, by the event response system, one or more potential collisions with the one or more objects, wherein the one or more potential collisions are associated with a region of interest; and adjusting the one or more perception sensors associated with the event response system to obtain data indicative of the region of interest, the region of interest associated with a trajectory of the vehicle.

9. The computer-implemented method of claim 8, wherein adjusting the one or more perception sensors associated with the event response system comprises filtering data corresponding to the region of interest, wherein the data indicative of the region of interest is obtained by the one or more perception sensors.

10. The computer-implemented method of claim 8, wherein detecting one or more potential collisions with the one or more objects comprises:

receiving sensor data from at least one sensor associated with the vehicle control system, wherein the sensor data includes data associated with the one or more objects; and determining, based on the sensor data, a movement of the one or more objects.

11. The computer-implemented method of claim 10, further comprising determining a predicted trajectory of at least one object of the one or more objects, the predicted trajectory indicative of a path along which the at least one object is predicted to travel over time.

12. The computer-implemented method of claim 8, wherein the vehicle is an autonomous truck.

13. The computer-implemented method of claim 8, further comprising adjusting a trajectory of the vehicle based on detecting the one or more potential collisions.

14. The computer-implemented method of claim 8, wherein monitoring the surrounding environment of the vehicle comprises iteratively detecting and tracking the one or more objects.

15. A vehicle, comprising:

one or more processors; and one or more tangible, non-transitory, computer readable media storing instructions executable by the one or more processors cause the vehicle to perform operations, the operations comprising:

monitoring, by an event response system that is separate from a vehicle control system on-board the vehicle and using one or more perception sensors controlled by a sensor steering system of the event response system, a surrounding environment of the vehicle, wherein the one or more perception sensors are independent from sensors associated with the vehicle control system;

based on monitoring the surrounding environment, identifying, by the event response system, one or more objects;

detecting, by the event response system, one or more potential collisions with the one or more objects, wherein the one or more potential collisions are associated with a region of interest; and adjusting the one or more perception sensors associated with the event response system to obtain data indicative of the region of interest, the region of interest associated with a trajectory of the vehicle.

16. The vehicle of claim 15, wherein adjusting the one or more perception sensors associated with the event response system comprises filtering data corresponding to the region of interest, wherein the data indicative of the region of interest is obtained by the one or more perception sensors.

17. The vehicle of claim 15, wherein detecting one or more potential collisions with the one or more objects comprises:

receiving sensor data from at least one sensor associated with the vehicle control system, wherein the sensor data includes data associated with the one or more objects; and determining, based on the sensor data, a movement of the one or more objects.

18. The vehicle of claim 17, the operations further comprising determining a predicted trajectory of at least one object of the one or more objects, the predicted trajectory indicative of a path along which the at least one object is predicted to travel over time.

19. The vehicle of claim 15, wherein the vehicle is an autonomous truck.

20. The vehicle of claim 15, the operations further comprising adjusting a trajectory of the vehicle based on detecting the one or more potential collisions.

* * * * *